(12) United States Patent
Hopkins et al.

(10) Patent No.: US 10,762,572 B1
(45) Date of Patent: Sep. 1, 2020

(54) VEHICLE INSPECTION SYSTEMS AND METHODS

(71) Applicant: United Services Automobile Association ("USAA"), San Antonio, TX (US)

(72) Inventors: John C. Hopkins, San Antonio, TX (US); William J. Cunningham, San Antonio, TX (US); David P. Dixon, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 347 days.

(21) Appl. No.: 15/232,524

(22) Filed: Aug. 9, 2016

Related U.S. Application Data

(60) Provisional application No. 62/206,055, filed on Aug. 17, 2015.

(51) Int. Cl.
| | |
|---|---|
| *G06Q 10/06* | (2012.01) |
| *H04W 4/029* | (2018.01) |
| *G01C 21/26* | (2006.01) |
| *G06Q 40/08* | (2012.01) |
| *H04N 7/18* | (2006.01) |
| *G06K 9/32* | (2006.01) |
| *G06T 5/20* | (2006.01) |
| *G06F 3/048* | (2013.01) |

(52) U.S. Cl.
CPC ............ *G06Q 40/08* (2013.01); *G06F 3/048* (2013.01); *G06K 9/325* (2013.01); *G06T 5/20* (2013.01); *H04N 7/181* (2013.01)

(58) Field of Classification Search
CPC ........ G06Q 40/08; H04W 4/029; G06F 3/048
USPC .......................................................... 705/4
See application file for complete search history.

(56) References Cited

U.S. PATENT DOCUMENTS

| | | | | |
|---|---|---|---|---|
| 2005/0251427 A1* | 11/2005 | Dorai | ..................... | G06Q 10/10 705/4 |
| 2008/0255887 A1* | 10/2008 | Gruter | ................... | G06Q 40/08 705/4 |

(Continued)

*Primary Examiner* — Hai Tran
(74) *Attorney, Agent, or Firm* — BakerHostetler

(57) ABSTRACT

Disclosed are vehicle inspection systems and methods, and more particularly, systems and methods for appraising the damage caused to a vehicle during an accident and in certain embodiments for dispositioning the vehicle from the accident scene. The disclosed appraisal systems can include one or more cameras, scanner and sensors and a computing device. The cameras can be mounted to a recovery vehicle, for example, for taking imagery of the damaged vehicle at an accident scene. The computing device receives the imagery from each camera and/or sensors/scanners and communicates the data and imagery to a remote server for use in a damage assessment. An evaluation is performed using the transmitted data and a determination is made as to whether sufficient information has been provided in order to allow an agent of the insurer and/or a data analysis module to make a damage assessment and provide a routing instruction for dispositioning the vehicle from the accident scene and, if appropriate, for automatically arranging a rental car service for the driver or owner of the damaged vehicle based on factors such as vehicle and coverage data.

39 Claims, 9 Drawing Sheets

(56) References Cited

U.S. PATENT DOCUMENTS

| | | | | |
|---|---|---|---|---|
| 2009/0138290 A1* | 5/2009 | Holden | ................ | G06Q 10/087 |
| | | | | 705/4 |
| 2009/0265193 A1* | 10/2009 | Collins | .............. | G06Q 30/0185 |
| | | | | 705/4 |
| 2016/0063642 A1* | 3/2016 | Luciani | ................. | G06Q 40/08 |
| | | | | 705/4 |

\* cited by examiner

VEHICLE INSPECTION SYSTEMS AND METHODS

CROSS REFERENCE TO RELATED APPLICATIONS

This application claims priority to U.S. Patent Application Ser. No. 62/206,055 filed Aug. 17, 2015 which is incorporated herein by reference in its entirety.

FIELD OF THE INVENTION

The disclosed embodiments generally relate to vehicle inspection systems and methods, and more particularly, to systems and methods for appraising the damage caused to a vehicle during an accident and in certain embodiments for dispositioning the vehicle from the accident scene and, if appropriate, for automatically arranging a rental car service for the driver of the damaged vehicle.

BACKGROUND OF THE INVENTION

Currently, most rapid, on-scene or remote vehicle appraisal systems and processes require assistance from the vehicle owner or someone else using a camera and/or a smart device. Such systems can introduce some inherent safety and risk concerns due to the nature of most accident scenes being around moving traffic and emergency vehicles.

Moreover, when the vehicle is deemed non-drivable, it must be removed from the accident scene by means of a recovery vehicle or tow truck. It is not uncommon for the owner, the driver of the recover vehicle or the insurance company to not know whether the vehicle should be taken to a repair facility or to a salvage yard. Many times, the wrong decision is made since the vehicle appraisal remains outstanding at the time when a decision is needed as to where to disposition the vehicle. These delivery errors burden both the owner and the insurance company with significantly extra time and cost.

Moreover, reliance on human adjusters to inspect a damaged vehicle at a remote location can be a big expense for insurance companies, especially when travel to remote locations is necessary.

There is a need therefore, for a cost-effective, on-scene or remote vehicle inspection system which reduces the safety concerns identified above. Preferably, the system is capable of providing a recommendation for dispositioning the vehicle from the accident scene or remote location and for automatically providing rental car services to the vehicle driver or policy owner if appropriate based on information, such as for example, vehicle and coverage data.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a vehicle inspection system is described which appraises the damage caused to a vehicle during an accident and in certain embodiments, provides instruction to a recovery vehicle operator for example, for dispositioning the vehicle from the accident scene and, if appropriate, for automatically arranging a rental car service for the driver of the damaged vehicle or the vehicle owner based on factors, such as vehicle or coverage data.

In an embodiment, the disclosed appraisal and routing system for a damaged vehicle, includes, inter alia, at least one camera and a computing device. The at least one camera is mounted to a recovery vehicle for taking imagery of the damaged vehicle at an accident scene in support of a damage assessment. Those skilled in the art will readily appreciate that any number of cameras could be provided with the system without departing from the inventive aspects of the present disclosure. For instance, multiple cameras are strategically mounted on a flat-bed style recovery vehicle that whenever the vehicle is drawn up or pulled up into a stable moving position on the recovery vehicle, the fixed and movable video capable cameras are strategically located in positions to capture critical angles and aspects of the damaged vehicle. As such, the damage assessment process is enabled to automatically take place for each vehicle every time in a passive manner that requires no additional camera or assessment expertise by the recovery vehicle operator.

Still further, in another embodiment, the truck operator may interact with an onboard computer (e.g., a tablet device (such as an iPad™) which may or may not be mounted inside the recovery vehicle) for providing additional business or customer interaction requirements/service offerings. Also, an application executing on the onboard computer provided to the owner/customer by an associated insurance provider or collision repair shop, may offer additional features of convenience to improve the experience such as approve initial damage payments or rental car arrangements in real time.

It is envisioned that the computing device is in communication with the at least one camera and receives the imagery from the at least one camera. The computing device includes a memory and a processing unit; wherein the processing unit is disposed in communication with said memory, and the processing unit upon execution of instructions stored in the memory is configured to cause the at least one camera to take the imagery.

This embodiment of the appraisal and routing system further includes a transmitter for communicating the imagery obtained by the at least one camera to a remote server for use in a damage assessment; and a receiver for receiving a routing instruction for the damaged vehicle which is based on the damage assessment. In particular embodiments, the transmitter communicates the imagery obtained by the at least one camera to a cloud storage server.

It is envisioned that the system can further include a portable camera for taking additional imagery of the damaged vehicle and communicating the additional imagery to the computing device. The portable camera could be for example, a handheld camera, or a camera which is attached or secured in some fashion to the driver of the recovery vehicle or the damaged vehicle.

In certain constructions the system is equipped with at least one scanner or sensor for detecting vehicle indicia or identification data and communicating the same to the computing device. For example, the at least one sensor can be adapted for detecting at least one of: a registration number, a vehicle identification number, or a license plate number for the damaged vehicle.

In certain embodiments, some of the imagery taken by the at least one camera includes still pictures. The imagery taken by the at least one camera can also include video or be exclusively video.

In certain application, the camera used in embodiments of the system includes a filter to facilitate the detection of damage to the damaged vehicle. For example, the camera could include a Gabor filter or a linear filter used for edge detection.

In embodiments of the present disclosure, the computing device used in the damage appraisal system is a mobile computer mounted within the recovery vehicle. Alternatively or additionally, the computing device can be a mobile phone or other smart device.

Preferably, the system further includes a graphical user interface which allows additional data relating to the damaged vehicle to be provided to the computing device and stored in the memory of the computing device.

Embodiments of the system can also be provided with a data analysis module which compares baseline condition data for the damaged vehicle to present condition data to determine an amount of damage to the vehicle. For example, the computing device can include the data analysis module.

Also disclosed herein are methods for appraising the damage caused to a vehicle and for disposition the vehicle from an accident scene and, if appropriate, for automatically arranging a rental car service for the driver of the damaged vehicle. In a representative method, at least one camera is mounted to a recovery vehicle and obtains imagery of the damaged vehicle at the accident scene in support of a damage assessment. The camera(s) communicate to a computing device the imagery obtained by the at least one camera. The computing device includes memory and a processing unit; wherein the processing unit is disposed in communication with said memory, and the processing unit upon execution of instructions stored in the memory is configured to cause the at least one camera to obtain the imagery. The imagery obtained by the at least one camera is communicated to a remote server using a transmitter for use in a damage assessment. A routing instruction is received by a receiver for the damaged vehicle which is based on the damage assessment. Moreover, the appraisal and dispositioning method can include the additional step of automatically initiating a rental car service for the driver or owner of the damage vehicle.

The appraisal method can further include the taking of additional imagery of the damaged vehicle using a portable camera and communicating the additional imagery to the computing device.

In certain embodiments of the disclosed appraisal method, at least one sensor or scanner is used to detect vehicle indicia and communicating the same to the computing device. Preferably, the at least one sensor is adapted for detecting at least one of: a registration number, a vehicle identification number, or a license plate number for the damaged vehicle.

Preferably, the imagery taken by the at least one camera includes still pictures. Alternatively or additionally, the imagery taken by the at least one camera can include video.

In certain embodiment of the presently disclosed method, the imagery taken by the at least one camera is filtered to facilitate the detection of damage to the damaged vehicle. In certain constructions, the filter is a Gabor filter.

The computing device used in an embodiment of the appraisal method can be a mobile computer mounted within the recovery vehicle. Alternatively or additionally, the computing device can be a mobile phone or smart device.

It is envisioned that additional data relating to the damaged vehicle can be provided using a graphical user interface to the computing device and storing the additional data in the memory of the computing device.

It is also envisioned that the imagery obtained by the at least one camera is transmitted to a cloud storage server.

An embodiment of the presently described appraisal method can include a data analysis module which is used to compare baseline condition data for the damaged vehicle to present condition data to determine an amount of damage to the vehicle. It is envisioned that the computing device can include the data analysis module.

Also disclosed herein is a remote appraisal system for a damaged vehicle, that includes, inter alia, a frame; at least one camera mounted to the frame for taking imagery of the damaged vehicle; at least one lighting apparatus mounted to the frame for illuminating the damaged vehicle; and a mobile computing device in communication with the at least one camera for receiving the imagery from the at least one camera. The mobile computing device includes memory and a processing unit; wherein the processing unit is disposed in communication with said memory, and the processing unit upon execution of instructions stored in the memory is configured to cause the at least one camera to take the imagery.

In certain embodiments, the remote appraisal system can include a transmitter for communicating the imagery obtained by the at least one camera to a remote server for use in a damage assessment. The transmitter can communicate the imagery obtained by the at least one camera to a cloud storage server.

The system could also include a receiver for receiving a routing instruction for the damaged vehicle which is based on the damage assessment.

It is envisioned that the system can also include at least one scanner or sensor for obtaining vehicle identification data. Preferably, the at least one scanner or sensor is adapted for detecting at least one of: a registration number, a vehicle identification number, or a license plate number for the damaged vehicle.

In an embodiment of the disclosed remote inspection system, the frame is attached to an inspection vehicle. Moreover, a robotic arm can be provided for manipulating the at least one camera.

It is envisioned that the system can include a portable camera for taking additional imagery of the damaged vehicle and communicating the additional imagery to the computing device.

The imagery taken by the camera(s) used in the disclosed systems can includes still pictures and/or video. Moreover, the camera(s) can include or be provided with a filter to facilitate the detection of damage to the damaged vehicle, such as a Gabor filter.

Embodiments of the presently described system can be provided with an armature movable secured to the frame. Moreover, the frame can include a plurality of rails and the armature can be adapted for liner movement along at least one of the plurality of rails.

It is envisioned that the mobile computing device can be a mobile computer mounted within the inspection vehicle. Alternatively, the computing device can be a mobile phone or smart device.

A graphical user interface can also be provided with embodiments of the remote appraisal system which allows additional data relating to the damaged vehicle to be provided to the computing device and stored in the memory of the computing device.

It is envisioned that certain embodiment of the remote appraisal system can include a data analysis module which compares baseline condition data for the damaged vehicle to present condition data to determine an amount of damage to the vehicle. In certain embodiments, the computing device includes the data analysis module.

It is further envisioned that the frame can include an awning for covering the damaged vehicle during a damage assessment.

Moreover, the system can include one or more of a FLIR One-shot deflectometry unit, an XG/CV-X series Machine Vision Systems Lineup Catalog, a 3D scanner or an optoN-CDT laser triangulation sensor.

Still further, in certain embodiments, the frame is associated with a drone and the system can include a LIDAR scanner.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
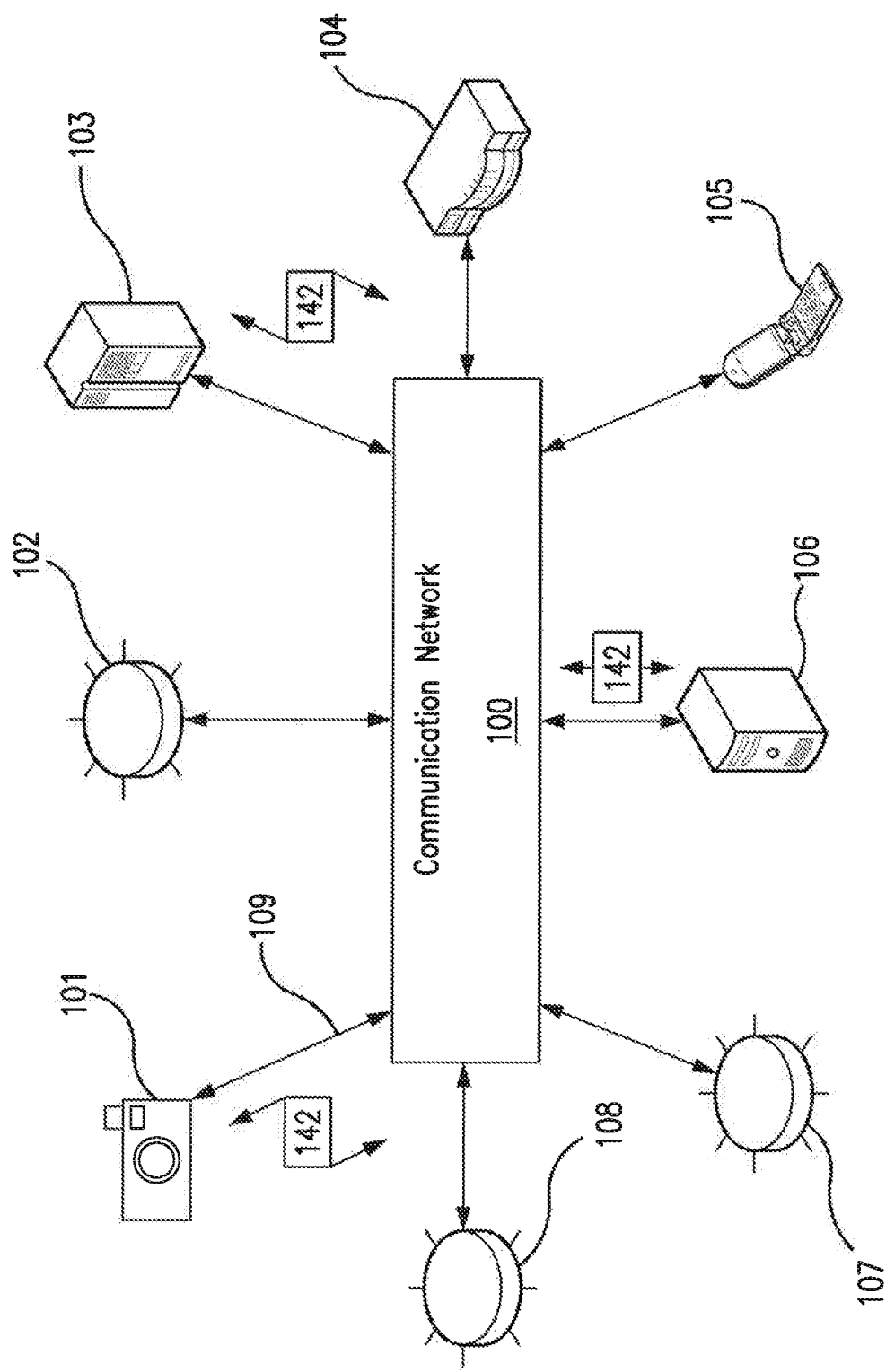
FIG. 1 illustrates an example communication network.

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims.

Turning now descriptively to the drawings, in which similar reference characters denote similar elements throughout the several views, FIG. 1 depicts an exemplary communications network 100 in which below illustrated embodiments may be implemented.

It is to be understood a communication network 100 is a geographically distributed collection of nodes interconnected by communication links and segments for transporting data between end nodes, such as personal computers, work stations, smart phone devices, tablets, televisions, sensors and or other devices such as automobiles, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

FIG. 1 is a schematic block diagram of an example communication network 100 illustratively comprising nodes/devices 101-108 (e.g., cameras, 101 sensors 102, computing devices 103, insurance claim system server 106, smart phone devices 105, web servers 104, routers 107, switches 108, and the like) interconnected by various methods of communication. For instance, the links 109 may be wired links or may comprise a wireless communication medium, where certain nodes are in communication with other nodes, e.g., based on distance, signal strength, current operational status, location, etc. Moreover, each of the devices can communicate data packets (or frames) 142 with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
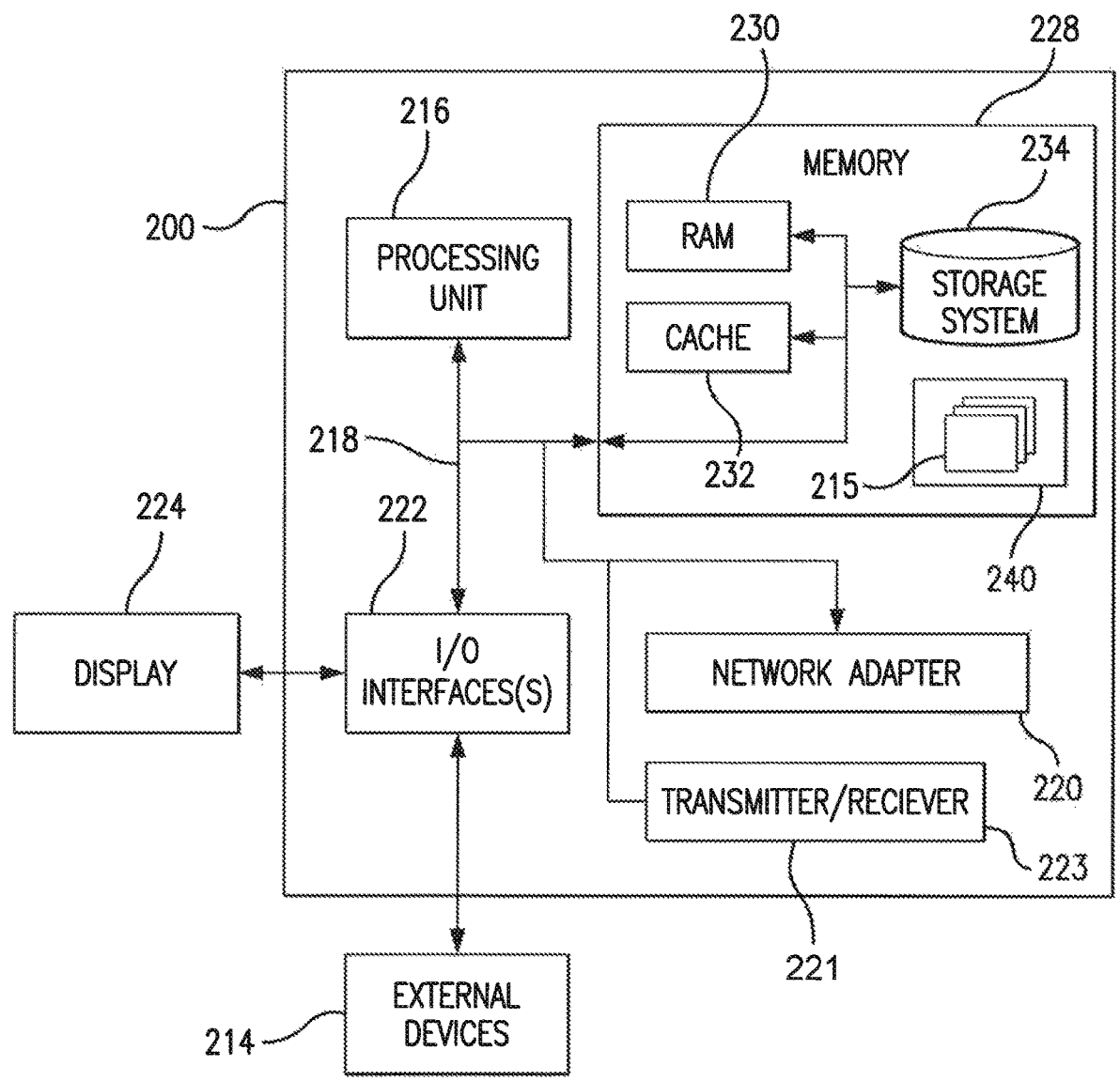
FIG. 2 illustrates an example network device/node.

FIG. 2 is a schematic block diagram of an example network computing device 200 (e.g., client computing device or computing device 103, server 106, etc.) that may be used (or components thereof) with one or more embodiments described herein, e.g., as one of the nodes shown in the network 100. As explained above, in different embodiments these various devices are configured to communicate with each other in any suitable way, such as, for example, via communication network 100.

Device 200 is intended to represent any type of computer system capable of carrying out the teachings of various embodiments of the present invention. Device 200 is only one example of a suitable system and is not intended to suggest any limitation as to the scope of use or functionality of embodiments of the invention described herein. Regardless, computing device 200 is capable of being implemented and/or performing any of the functionality set forth herein.

Computing device 200 is operational with numerous other general purpose or special purpose computing system environments or configurations. Examples of well-known computing systems, environments, and/or configurations that may be suitable for use with computing device 200 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, and distributed data processing environments that include any of the above systems or devices, and the like.

Computing device 200 may be described in the general context of computer system-executable instructions, such as program modules, being executed by a computer system. Generally, program modules may include routines, programs, objects, components, logic, data structures, and so on that perform particular tasks or implement particular abstract data types. Computing device 200 may be practiced in distributed data processing environments where tasks are performed by remote processing devices that are linked through a communications network. In a distributed data processing environment, program modules may be located in both local and remote computer system storage media including memory storage devices.

Device 200 is shown in FIG. 2 in the form of a general-purpose computing device. The components of device 200 may include, but are not limited to, one or more processors or processing units 216, a system memory 228, a transmitter 221, a receiver 223 and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing device 200 typically includes a variety of computer system readable media. Such media may be any available media that is accessible by device 200, and it includes both volatile and non-volatile media, removable and non-removable media.

System memory 228 can include computer system readable media in the form of volatile memory, such as random access memory (RAM) 230 and/or cache memory 232. Computing device 200 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 215, such as underwriting module, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 215 generally carry out the functions and/or methodologies of embodiments of the invention as described herein.

Device 200 may also communicate with one or more external devices 214 such as a keyboard, a pointing device, a display 224, etc.; one or more devices that enable a user to interact with computing device 200; and/or any devices (e.g., network card, modem, etc.) that enable computing device 200 to communicate with one or more other computing devices. Such communication can occur via Input/Output (I/O) interfaces 222. Still yet, device 200 can communicate with one or more networks such as a local area network (LAN), a general wide area network (WAN), and/or a public network (e.g., the Internet) via network adapter 220 and/or transmitter/receiver 221/223. As depicted, network adapter 220 communicates with the other components of computing device 200 via bus 218. It should be understood that although not shown, other hardware and/or software components could be used in conjunction with device 200. Examples, include, but are not limited to: microcode, device drivers, redundant processing units, external disk drive arrays, RAID systems, tape drives, and data archival storage systems, etc.

FIGS. 1 and 2 are intended to provide a brief, general description of an illustrative and/or suitable exemplary environment in which embodiments of the below described present invention may be implemented. FIGS. 1 and 2 are exemplary of a suitable environment and are not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

In the description that follows, certain embodiments may be described with reference to acts and symbolic representations of operations that are performed by one or more computing devices, such as the computing system environment 100 of FIG. 1. As such, it will be understood that such acts and operations, which are at times referred to as being computer-executed, include the manipulation by the processor of the computer of electrical signals representing data in a structured form. This manipulation transforms the data or maintains them at locations in the memory system of the computer, which reconfigures or otherwise alters the operation of the computer in a manner understood by those skilled in the art. The data structures in which data is maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

It is to be further appreciated; embodiments may be implemented with numerous other general-purpose or special-purpose computing devices and computing system environments or configurations. Examples of well-known computing systems, environments, and configurations that may be suitable for use with an embodiment include, but are not limited to, personal computers, handheld or laptop devices, personal digital assistants, tablet devices, smart phone devices, multiprocessor systems, microprocessor-based systems, set top boxes, programmable consumer electronics, network, minicomputers, server computers, game server computers, web server computers, mainframe computers, and distributed computing environments that include any of the above systems or devices. Embodiments may be described in a general context of computer-executable instructions, such as program modules, being executed by a computer. Generally, program modules include routines, programs, objects, components, data structures, etc., that perform particular tasks or implement particular abstract data types. An embodiment may also be practiced in a distributed computing environment where tasks are performed by remote processing devices that are linked through a communications network. In a distributed computing environment, program modules may be located in both local and remote computer storage media including memory storage devices.

Figure 3:
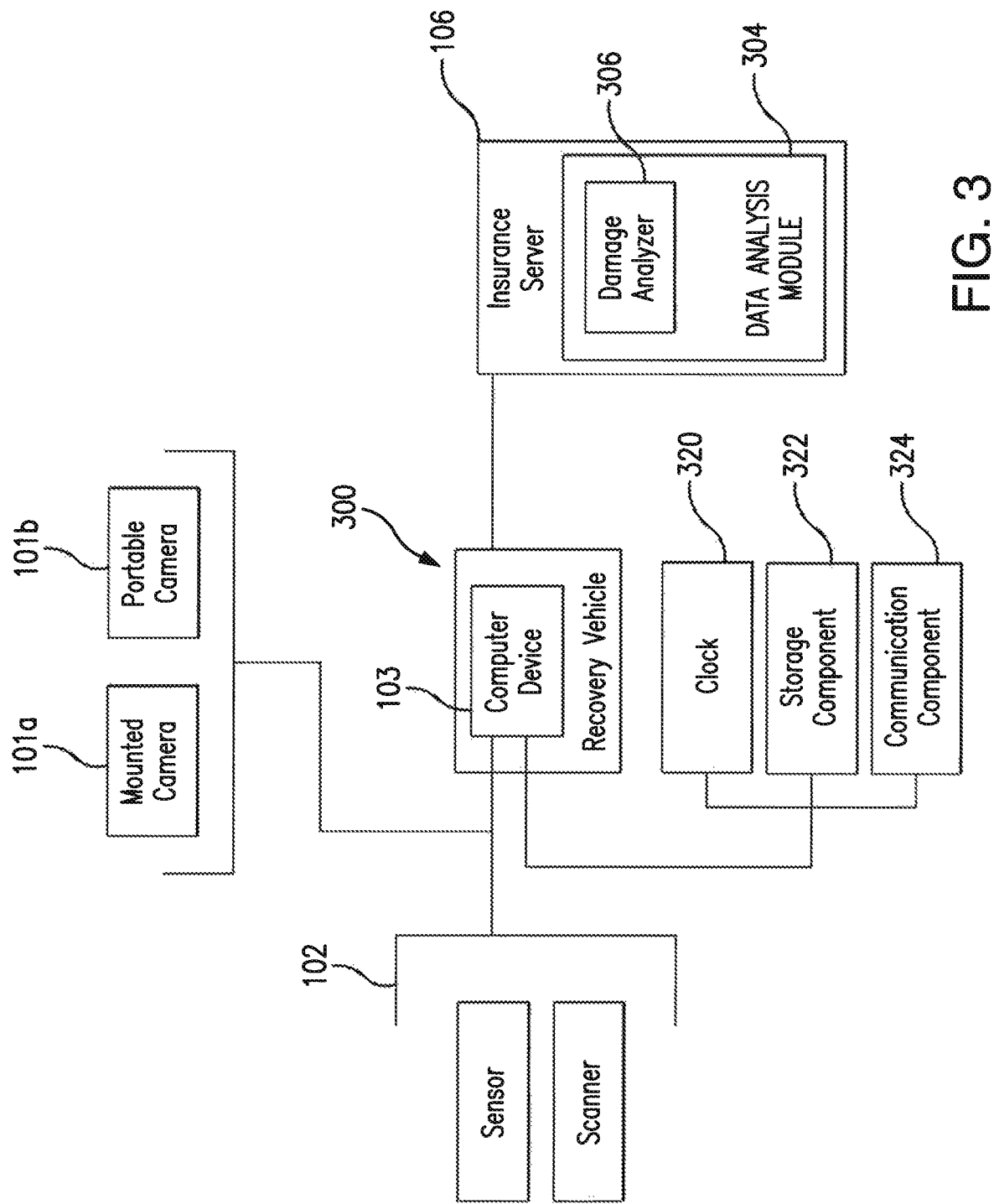
FIG. 3 is a block diagram of an appraisal system from which camera imagery and sensor data is captured for subsequent analysis in accordance with an illustrated embodiment.

With the exemplary communication network 100 (FIG. 1) and computing device 200 (FIG. 2) being generally shown and discussed above, description of certain illustrated embodiments of the present invention will now be provided. With reference now to FIG. 3 there is disclosed an appraisal system 300 for estimating the damage caused to a vehicle during an accident and for dispositioning the vehicle from the accident scene. Many accident scenes represent a dangerous environment for all persons involved, including the vehicle occupants, emergency professionals and the driver of the recovery vehicle. Appraisal system 300 is adapted for providing a safer and more expeditious assessment of the damaged caused to a vehicle and in certain embodiments provides guidance to the recovery vehicle driver as to the appropriate place tow the vehicle.

Appraisal system 300 includes one or more cameras 101 and a computing device 103. Those skilled in the art will readily appreciate that any number of cameras can be used without departing from the scope of the present disclosure. In certain constructions of system 300, only a single camera is provided.

Figure 4:
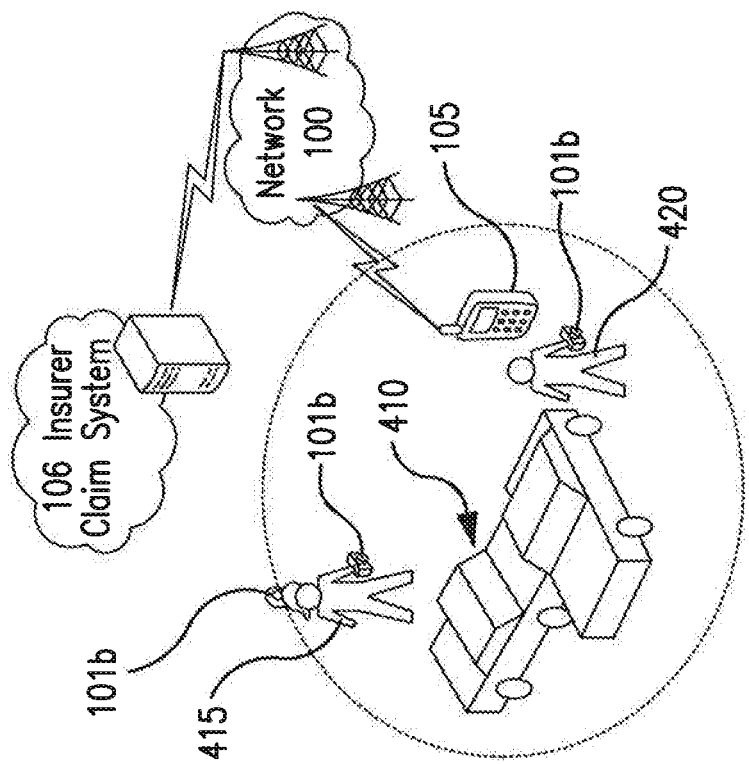
FIG. 4 depicts the utilization of the appraisal system of FIG. 3 at an accident scene.
Figure 4:
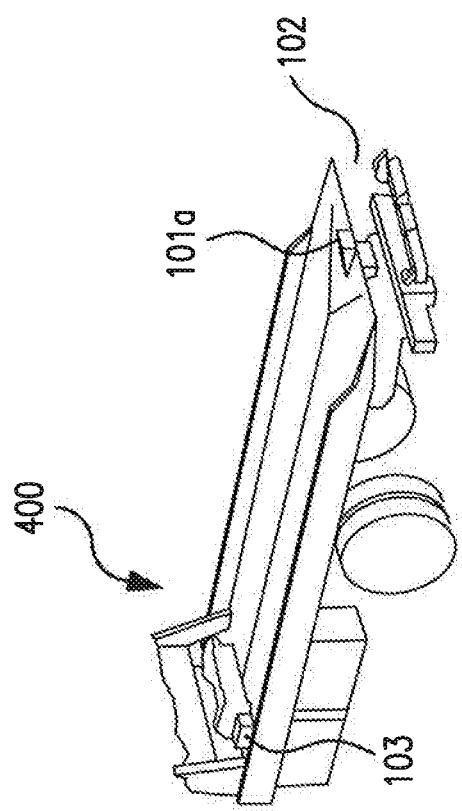

Cameras 101 can include "mounted cameras" 101a or cameras that are fixed to structural elements or frames and portable camera 101b. For example, as shown in FIG. 4, in an embodiment of the appraisal system of the present disclosure, cameras 101a are mounted or secured to recovery vehicle 400 for taking imagery of a damaged vehicle 410 at an accident scene in support of a damage assessment. Any number of mounted cameras 101a could be provided and mounted upon the recover vehicle without departing from the inventive aspects of the present disclosure. Each mounted camera 101a can be arranged to capture certain features or areas of the damage vehicle. In an illustrated embodiment, multiple cameras 101a are strategically mounted on a flat-bed style recovery vehicle 400 such that whenever a vehicle 410 is drawn up or pulled up into a stable moving position on the recovery vehicle 400, the fixed and movable video capable cameras 101a are strategically located in positions to capture critical angles and aspects of the damaged vehicle 410. Thus, it is to be understood that in an embodiment cameras 101a (which may be small and mounted in protected areas) are mounted in strategic locations on the recovery vehicle 400 (e.g., such as corners of the flat bed, top corners or a movable track along the top edge of the cab as well as a potential sweeper arm that moves up and over from left to right at the rear of the bed to capture all of the end of the vehicle facing the rear of the flat bed once it is in the move position). As such, the damage assessment process is enabled to automatically take place for each vehicle every time in a passive manner that requires no additional camera or assessment expertise by the recovery vehicle operator.

Computing device 103 is in communication with the camera(s) 101 and receives the imagery or data taken by each of the cameras 101. As shown in FIG. 4, computing device 103 is secured to the rear of recovery 400 vehicle and can be accessed by the driver when outside the recovery vehicle. Alternatively, computing device 103 can be mounted in a different location, such as within the passenger compartment of recovery vehicle 400; it can be remotely located or be a handheld computing device.

As discussed previously, computing device 103 includes a memory 228 and a processing unit 216. The processing unit 216 is disposed in communication with the memory 228, and the processing unit 216 upon execution of instructions stored in the memory 228 is configured to instruct all or certain cameras 101 to take imagery, such as pictures or video of the damage vehicle 410.

As shown in FIG. 4, system 300 can also include a portable camera 101b for taking additional imagery of the damaged vehicle and the additional imagery is then provided to computing device 103. The portable cameras 101b could be for example, handheld cameras, or cameras which are attached or worn in some fashion by the driver 415 of the recovery vehicle 400 or the driver 420 of damaged vehicle 410.

System 300 can also be equipped with one or more scanners or sensors 102 for detecting information, such as but not limited to, vehicle indicia or identification data and communicating the same to the computing device 103. For example, the sensors or scanners can be adapted for detecting information such as: a vehicle registration number, a vehicle identification number, or a license plate number.

Advantageously, certain cameras 101 can be provided with a filter to facilitate the detection of damage to the vehicle. For example, the camera could include a Gabor filter or a linear filter used for edge detection.

A transmitter 221 and/or network adapter 220 associated with computing device 103 communicates the imagery obtained by camera(s) 101 and the information from sensors/scanners 102 to a remote server 104/106 for use in a damage assessment or appraisal. After the damage assessment is conducted remotely by a representative of the insurer, for example, receiver 223 receives a routing instruction for the damaged vehicle 410 which is based on the damage assessment.

Although, the computing device 103 used in the damage appraisal system 300 shown in FIG. 4 is a mobile computer mounted to the recovery vehicle 400, it will be appreciated that the computing device 103 can be a mobile phone or other smart device used by the driver of the recovery vehicle or the damaged vehicle.

As discussed previously with respect to computing device 103, computing device 403 can be equipped with a graphical user interface, a keyboard or other peripheral which allows additional data, imagery, etc. relating to the damaged vehicle to be utilized in the appraisal and routing process. For example, a graphical user interface could be used to provide instructions to the driver of the recovery vehicle as to what additional images if any would be needed for a complete damage assessment. Moreover, a keyboard can allow for the input of additional information, such as damage notes or comments. Additional, computing device 103 may be configured to provide a virtual appraisal based upon detected vehicle damage, which virtual appraisal is caused to be wirelessly transmitted from the computing device to a repair shop thus obviating the need of an appraisal to be performed at the repair shop.

System 300 can also be provided with a data analysis module 304 which can, for example, compare baseline condition data for the damaged vehicle to present condition data or imagery taken by the systems cameras and/or sensors to determine an amount of damage to the vehicle. For example, dimensional information for each vehicle model can be stored in memory as baseline condition data and compared to dimensional information obtained by one or more of the cameras 101 or scanners 102. The data analysis module 304 could be remotely located at the insurance server 106 or be provided with computing device 103.

Computing device 103 may additionally be coupled to a clock 320 which may keep track of time for device 103, thereby allowing a given item of data to be associated with the time at which the data was captured.

A storage component 322 may further be provided and utilized to store data readings, imagery and/or timestamps in device 403. For example, storage component 322 may comprise, or may otherwise make use of, magnetic or optical disks, volatile random-access memory, non-volatile random-access memory, or any other type of storage device. There may be sufficient data storage capacity to store several hours or several days' worth of readings.

A communication component 324 may further be provided and utilized to communicate recorded information from mobile computing device 103 to an external location, such as computer server 106, which may be associated with an insurance carrier such as USAA. Communication component 324 may be, or may comprise, a network communication card such as an Ethernet card, a WiFi card, or any other communication mechanism. However, communication component 324 could take any form and is not limited to these examples. Communication component 324 might encrypt data that it communicates, in order to protect the security and/or privacy of the data.

Communication component 324 may communicate data recorded by device 403 (e.g., data stored in storage component 322) to an external location, such as server 106. For example, server 106 may be operated by an insurance company, and may collect data from computing device 103 in order to learn about the damage caused to vehicle 410. Communication component 324 may initiate communication sessions with server 106. Or, as another example, server 106 may contact device 103, through communication component 324, in order to receive data that has been stored by device 403.

In the example of FIG. 3, communication component 324 (which is shown, in FIG. 3, as being part of, or used by computing device 103 communicates data to server 106. Server 106 may comprise, or otherwise may cooperate with, a data analysis module 304, which may analyze data in some manner. Data analysis module 304 may comprise various types of sub-modules, such as damage analyzer 306. In general, damage analyzer 306 may perform an analysis of collected data regarding various aspects of damaged vehicle 410, such as data that used to determine the extent of frame damage to vehicle 410.

System 300 allows the damage to the vehicle to be appraised and the situation at the accident scene to be triaged immediately. System 300 can take into account the known vehicle value, use damage tables and stored coverage data for the vehicle in order to make a damage assessment and determine the optimal destination and routing information for the vehicle. For example, if it is determined that the vehicle damage is rated at a total loss, then the route destination is to a trusted salvage partner location and system 300 can trigger an appropriate rental car order for the vehicle driver/customer/member to be ready at a partner location or specified location based on vehicle and coverage data. If system 300 determines that the damage assessment is incomplete or not determinable, additional information can be requested or the routing information can be for a trusted repair facility or facility designated by the customer and if appropriate, rental car services can be initiated for the customer. Lastly, if it is determined that the vehicle is repairable, a routing instruction could be to a trusted repair facility or customer designated facility for vehicle repair and again, if appropriate, rental car services can be initiated. It should be noted, that the customer/owner/driver can designate location for drop-off or pickup of the rental car. For example, the rental car can be delivered to the accident scene or picked up at the rental car agency.

System 300 can be initiated either manually, by the driver of the recovery vehicle or the driver of the damaged vehicle, for example, or automatically by the GPS location data obtained from a smart device or GPS unit installed in the vehicle.

Figure 5:
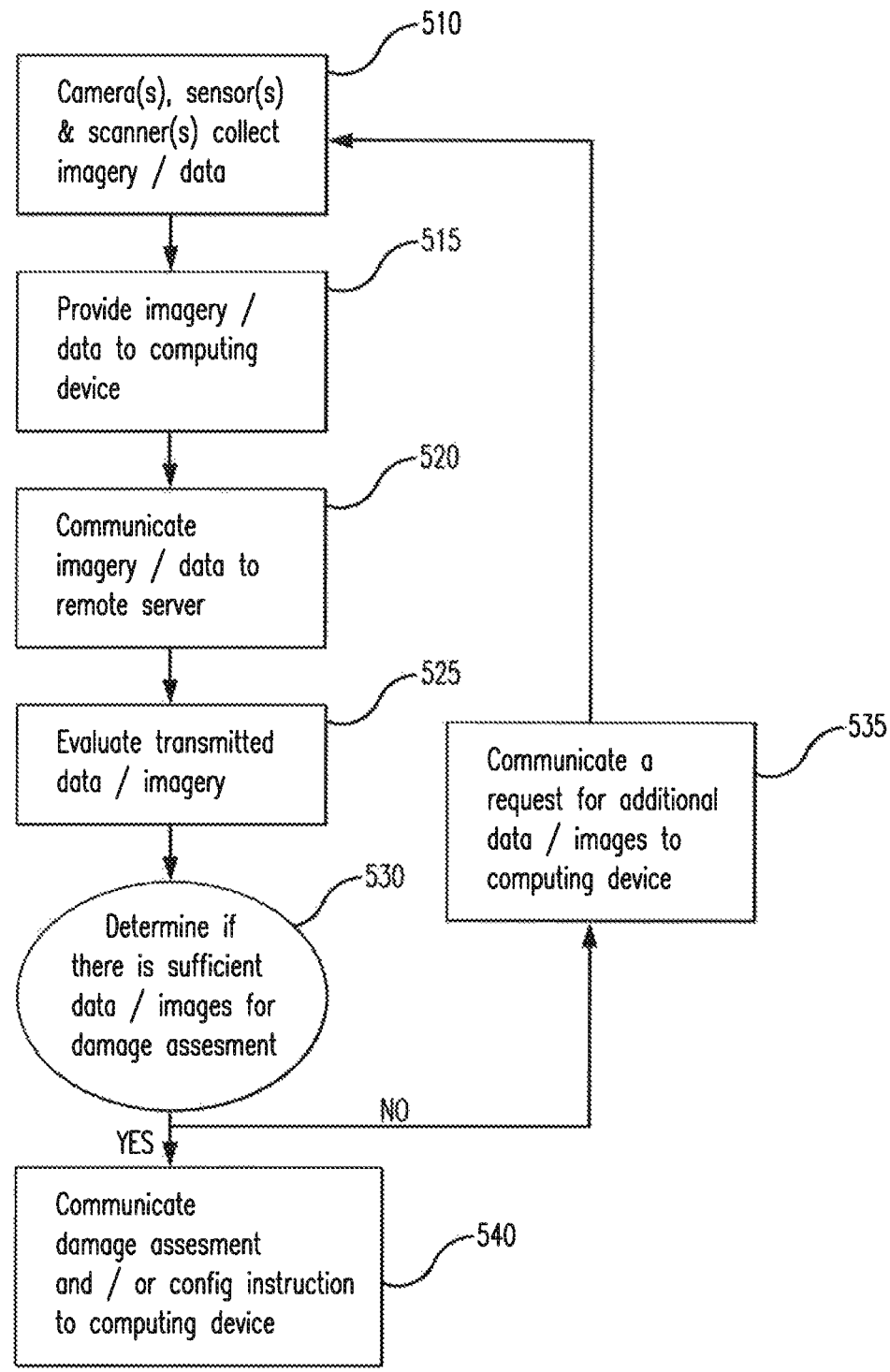
FIG. 5 is a flow diagram of the operational steps of an appraisal system in accordance with an illustrated embodiment.

With reference to FIG. 5 which provides a flow diagram of certain operational steps for a method of using appraisal system 300 in accordance with an illustrated embodiment of the present disclosure. It should be appreciated that these operational steps may be carried out in any system and are not limited to the scenario shown in the aforementioned figures. Additionally, the flow diagram in FIG. 5 shows an example in which operational steps are carried out in a particular order, as indicated by the lines connecting the blocks, but the various steps shown in these diagrams can be performed in any order, or in any combination or sub-combination.

Following an accident in which an insured vehicle is damaged and is potentially not drivable, a recovery vehicle is dispatched to the accident scene. In certain instances, the recovery vehicle is dispatched by the insurer and the recovery vehicle and/or its operator is provided with an appraisal and routing system such as system 300. As discussed above with respect to FIG. 4, system 300 includes one or more cameras which can be mounted to the recovery vehicle. System 300 also includes a computing device which is in communication with the cameras.

In step 510, the computing device instructs the camera(s) and or sensors/scanners to take imagery of the damaged vehicle at the accident scene and to collect data in support of a damage assessment and the determination of a routing instruction. The imagery taken by the camera(s) and data retrieved by the sensors/scanners is provided/transmitted to the computing device at step 515. Then at step 520, the imagery or data obtained by the camera(s) and/or sensors/scanners is communicated to a remote server for use in a damage assessment. At step 525 an evaluation is performed using the transmitted data and at step 530 a determination is made as to whether sufficient information has been provided in order to allow an agent of the insurer and/or a data analysis module to make a damage assessment. If insufficient information has been provided, then at step 535 a communication or request is sent to the computing device for more information. The request can include specific instruction as to what additional details are desired and provide program instruction to the computing device for use in directing specific cameras, sensors or scanners.

If sufficient information has been provided, then a damage assessment is conducted and communicated at step 540 to the driver of the recovery vehicle or the damaged vehicle, for example. Those skilled in the art will readily appreciate that such an assessment can be conducted using automated systems, such as a damage analysis module, which reviews the imagery, filtered images, scans or other imagery, information and/or data to evaluate the magnitude of damage caused to the vehicle. Alternatively, the collected information can be reviewed at least in part by an agent of the insurer who will then communicate the damage assessment and routing instructions to the computing device.

As discussed previously, the sensors or scanners can be used to detect vehicle indicia or identification information which is then communicated to the computing device. For example, the registration number, vehicle identification number, or license plate number for the damaged vehicle can be determined by the scanners/sensors which will enable the system to then identify the policy owner and specific policy for the damaged vehicle.

Referring now to FIGS. 6-9 which illustrate several remote appraisal systems for evaluating the damaged caused to a vehicle. These systems have been identified by references numerals 600, 700, 800 and 900 respectively and like reference numerals identify similar structural/functional features.

The systems shown in these figures are adapted to be utilized at remote location such as an accident scene, a repair facility or a residence of the vehicle owner. Each system includes a frame 610/710/810/910; one or more cameras 620/720/820/920 mounted to the frame for taking imagery of the damaged vehicle and a mobile computer. Additionally, in each of the systems 600-900, a lighting arrangement (not shown) could be provided so as to illuminate the vehicle and improve the imagery taken by camera(s) 620.

In system 600, the structure of frame 610 is similar to that used in a high pressure car wash system. Frame 610 has an upper frame section 615 and several support legs 612*a-d*. The upper frame section 615 includes longitudinally opposed front and rear arched sections 617*a*/617*b* which are connected at their respective ends to laterally opposed side beams 619*a*/619*b*. Although not shown, a cover can be provided with system 600 in order to protect the vehicle and/or components of system 600 from the elements during the appraisal process. The cover could be for example, draped over and secured to the upper frame section 615.

Figure 6:
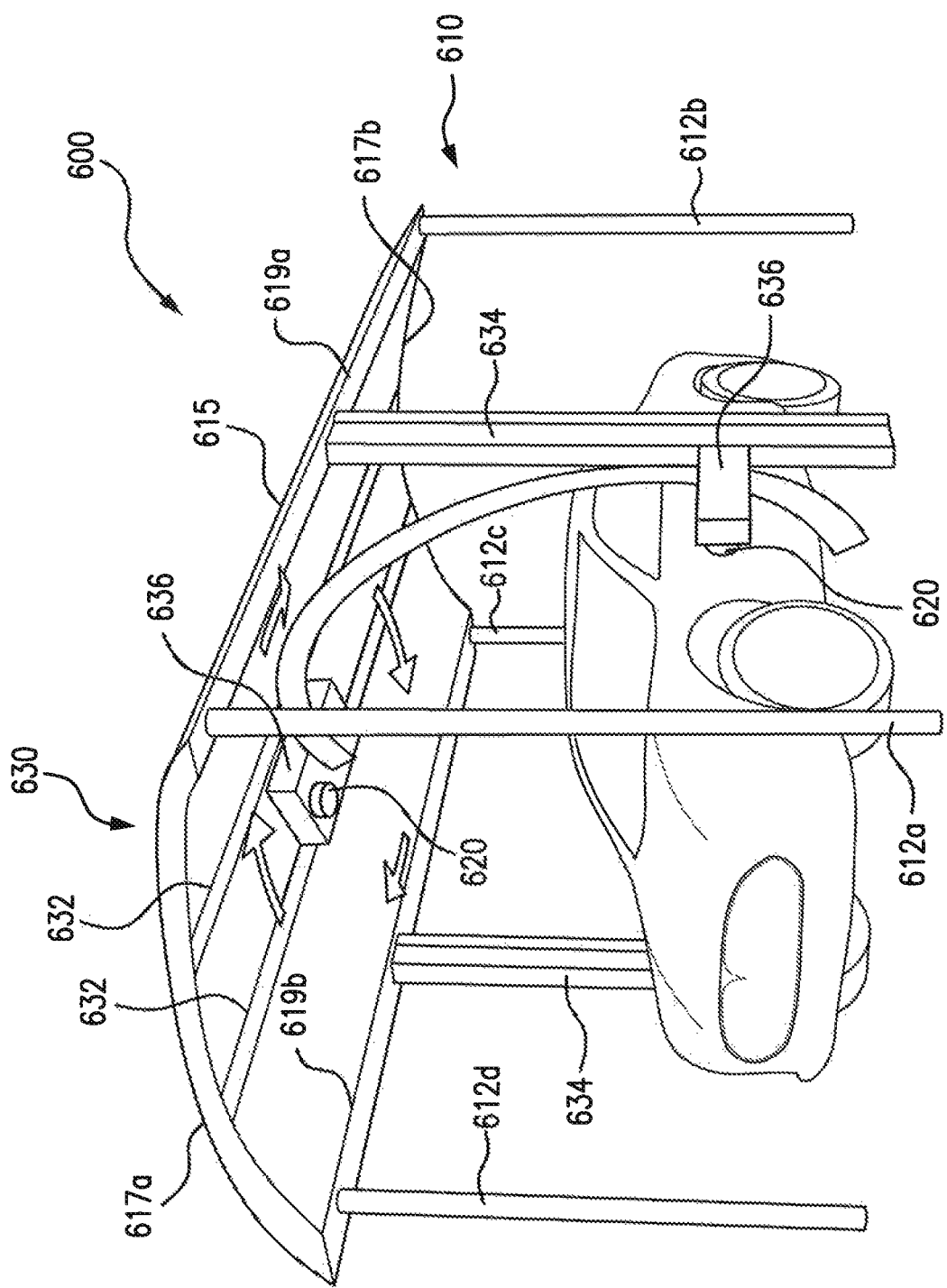
FIGS. 6-9 provide illustrations of appraisal systems embodiments in accordance with the present disclosure used in various applications.

With continued reference to FIG. 6, system 600 also includes an armature assembly 630 which allows the cameras to be repositioned with respect to the vehicle. Armature assembly 630 includes two longitudinally extending slide rails 632, two vertical slide rails 634 and movable platforms 636. As shown, both the upper and lower cameras 620 are mounted on a movable platform 636 which can slide linearly with respect to the slide rail to which its attached and rotate 360 degrees in the plane of the slide rail.

Figure 7:
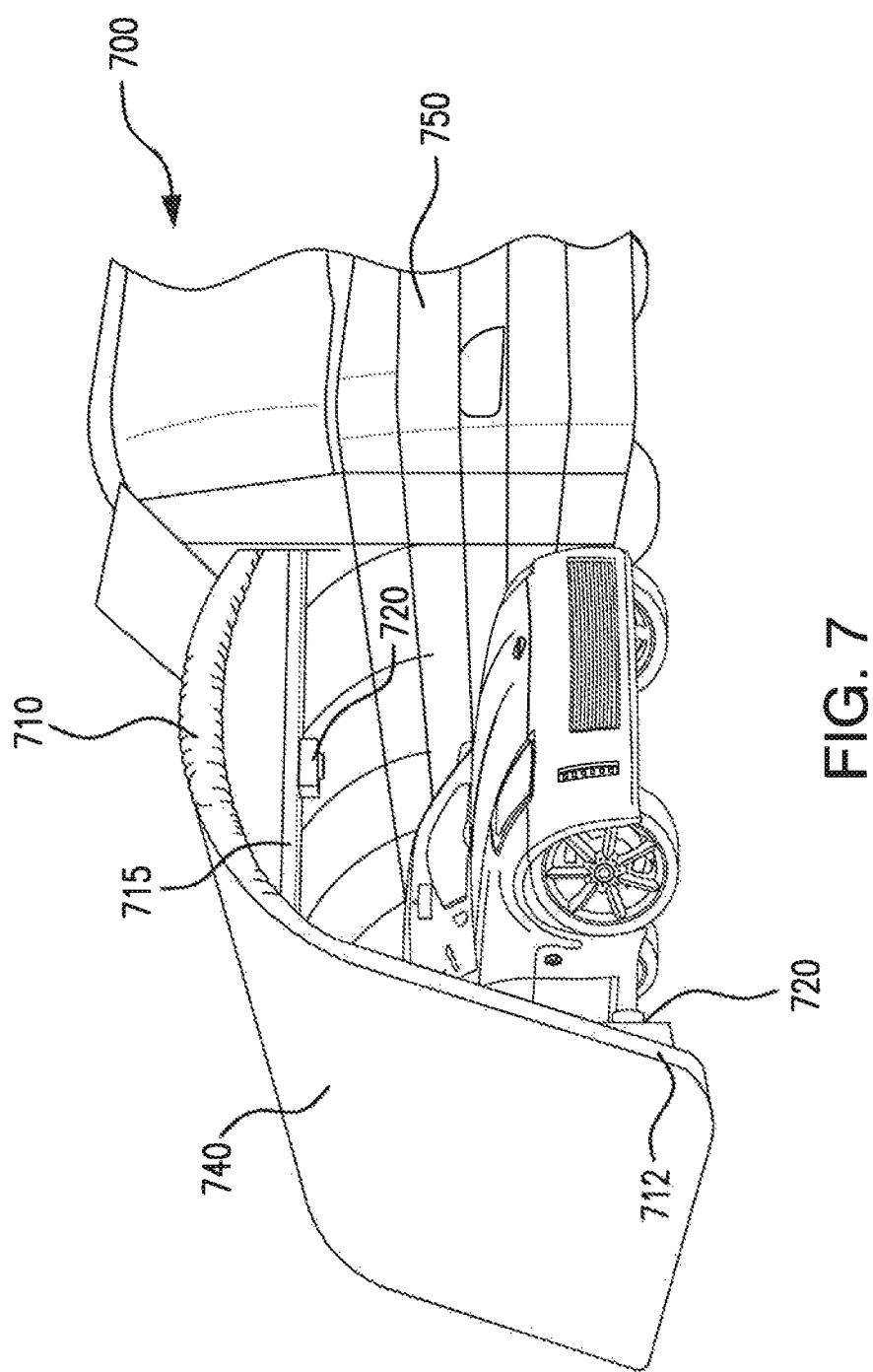

With reference to FIG. 7, like system 600, system 700 includes a frame 710 that has an upper section 715 and a plurality of legs 712. In this embodiment several cameras 720 are rigidly affixed to the legs 712 and upper frame 715. Those skilled in the art will readily appreciate that this system could also include slide rails and rotating armatures and the like without departing from the inventive aspects of the present disclosure.

Figure 8:
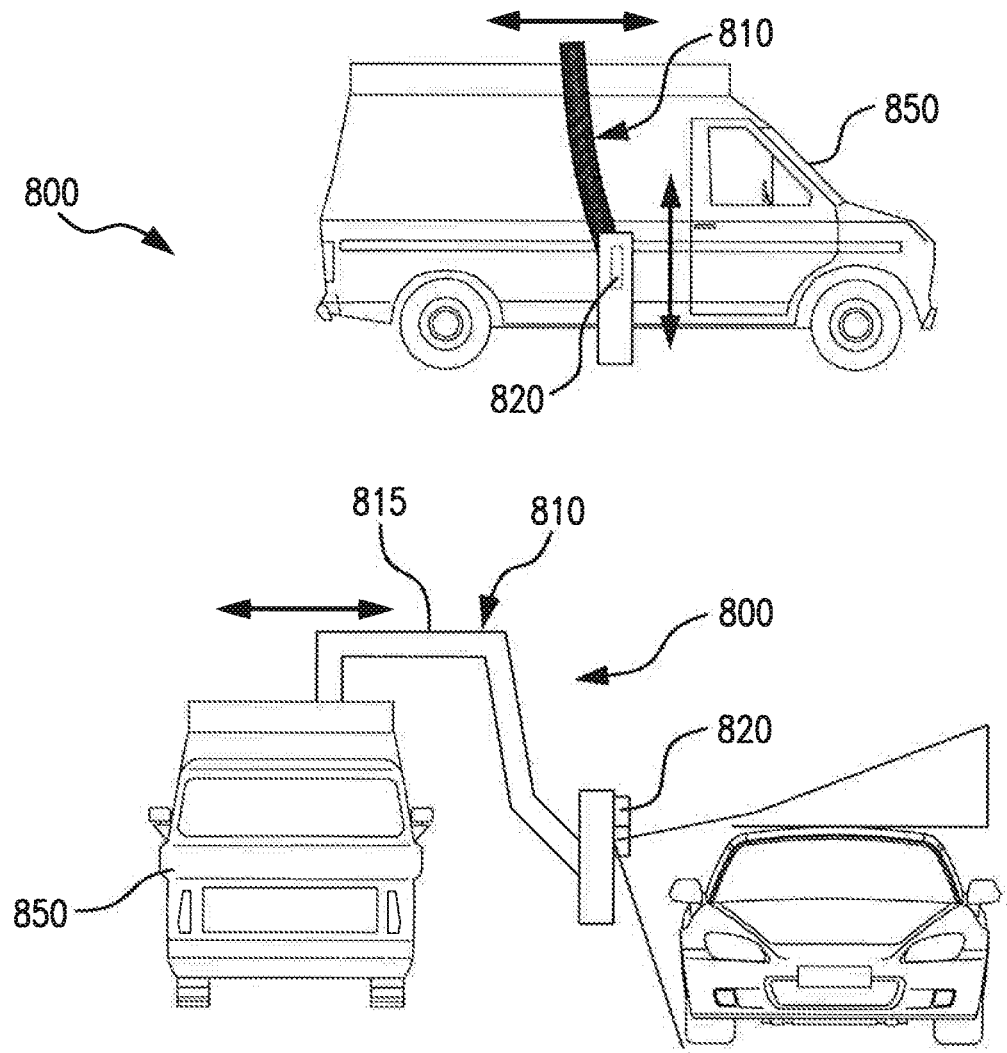

As shown in FIG. 7, frame 710 is secured to a large rapid deployment vehicle 750 which allows system 700 to be transported to the remote location of the damaged vehicle. Moreover, an awning or cover 740 is provided to protect the components of system 700 from the elements. FIG. 8 provides a further embodiment of the remote appraisal system of the present disclosure which is designated as reference numeral 800. System 800 is adapted to be secured to a van 850, which allows the system to be easily transportable. The frame 810 used in system 800 extends from the roof of the van 850 and includes a robotic arm 815 or mechanisms which allow camera 820 to rotate and move in the fore-aft, lateral and vertical directions as shown by the arrows.

Figure 9:
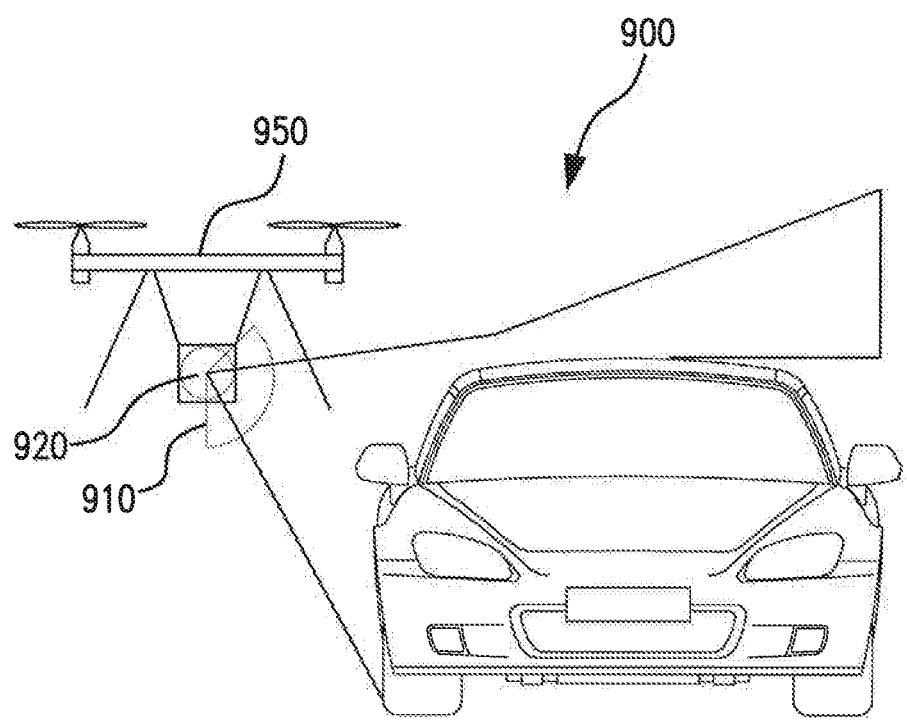

FIG. 9 illustrates an embodiment wherein the camera 920 and frame 910 are secured to a drone 950. System 900 can be transported to the damaged vehicle using the drone 950 and can remotely scan and assess the damage caused to the vehicle.

Like system 300, each of systems 600/700/800/900 includes a mobile computing device in communication with the camera(s) for receiving the imagery from the at least one camera. The mobile computing device can be located within the disposition appraisal vehicle, such as van 850 or could be for example, a smart device or phone used by an agent of the insurer or the owner of the damaged vehicle. These systems include many or all of the components (e.g. scanners) as described for use in system 300 and can also function and operate in a similar manner as described with reference to FIG. 5.

For example, systems 600-900 could include portable for taking additional imagery of the damaged vehicle and communicating the additional imagery to the computing device. The camera(s) can include or be provided with a filter to facilitate the detection of damage to the damaged vehicle, such as a Gabor filter. Additionally, a graphical user interface can also be provided with embodiments of the remote appraisal system which allows additional data relating to the damaged vehicle to be provided to the computing device and stored in the memory of the computing device. Exemplary equipment for use with these systems could include (but are not limited to): a FLIR One-shot deflectometry unit, an XG/CV-X series Machine Vision Systems Lineup Catalog, a 3D scanner or an optoNCDT laser triangulation sensor. Still further, in certain embodiments, such as the drone application shown in FIG. 9, the system can include a LIDAR scanner.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. An appraisal and routing system for a damaged vehicle, comprising:
   i. at least one camera mounted to a recovery vehicle for taking imagery of the damaged vehicle at an accident scene in support of a damage assessment when the damaged vehicle is loaded onto the recovery vehicle, wherein the recovery vehicle is configured to transport the damaged vehicle;
   ii. a computing device in communication with the at least one camera for receiving the imagery from the at least one camera, the computing device including memory and a processing unit; wherein the processing unit is disposed in communication with said memory, and the processing unit upon execution of instructions stored in the memory is configured to cause the at least one camera to take the imagery;
   iii. a transmitter for communicating the imagery obtained by the at least one camera to a remote server for use in a damage assessment; and
   iv. a receiver for receiving a routing instruction for the damaged vehicle which is based on the damage assessment.

2. The system as recited in claim 1, further comprising a portable camera for taking additional imagery of the damaged vehicle and communicating the additional imagery to the computing device.

3. The system as recited in claim 1, further comprising at least one sensor for detecting vehicle indicia and communicating the same to the computing device.

4. The system as recited in claim 3, wherein the at least one sensor is adapted for detecting at least one of: a registration number, a vehicle identification number, or a license plate number for the damaged vehicle.

5. The system as recited in claim 1, wherein the imagery taken by the at least one camera includes still pictures.

6. The system as recited in claim 1, wherein the imagery taken by the at least one camera includes video.

7. The system as recited in claim 1, wherein the camera includes a filter to facilitate detection of damage to the damaged vehicle.

8. The system recited in claim 1, wherein the camera includes a Gabor filter.

9. The system as recited in claim 1, wherein the computing device is a mobile computer mounted within the recovery vehicle.

10. The system as recited in claim 1, wherein the computing device is a mobile phone or smart device.

11. The system as recited in claim 1, further comprising a graphical user interface which allows additional data relating to the damaged vehicle to be provided to the computing device and stored in the memory of the computing device.

12. The system as recited in claim 1, wherein the transmitter communicates the imagery obtained by the at least one camera to a cloud storage server.

13. The system as recited in claim 1, further comprising a data analysis module which compares baseline condition data for the damaged vehicle to be present condition data to determine an amount of damage to the vehicle.

14. A remote appraisal system for a damaged vehicle, comprising:
   i) a frame configured to be attached to a wheeled inspection vehicle;
   ii) at least one camera mounted to the frame for taking imagery of the damaged vehicle;
   iii) a robotic arm operatively coupled with the frame for manipulating the at least one camera;
   iv) at least one lighting apparatus mounted to the frame for illuminating the damaged vehicle; and
   v) a mobile computing device in communication with the at least one camera for receiving the imagery from the at least one camera, the mobile computing device including memory and a processing unit, wherein the processing unit is disposed in communication with said memory, and the processing unit upon execution of instructions stored in the memory is configured to cause the at least one camera to take the imagery.

15. The system as recited in claim 14, further compromising a transmitter for communicating the imagery obtained by the at least one camera to a remote server for use in a damage assessment.

16. The system as recited in claim 15, further comprising a receiver for receiving a routing instruction for the damaged vehicle which is based on the damage assessment.

17. The system as recited in claim 16, wherein the at least on scanner or sensor is adapted for detecting at least one of: a registration number, a vehicle identification number, or a license plate number for the damaged vehicle.

18. The system as recited in claim 15, wherein the transmitter communicates the imagery obtained by the at least one camera to a cloud storage server.

19. The system as recited in claim 14, further comprising at least one scanner or sensor for obtaining vehicle identification data.

20. The system as recited in claim 14, further comprising a portable camera for taking additional imagery of the damaged vehicle and communicating the additional imagery to the computing device.

21. The system as recited in claim 14, wherein the imagery taken by the at least one camera includes still pictures.

22. The system as recited in claim 14, wherein the imagery taken by the at least one camera includes video.

23. The system as recited in claim 14, wherein the at least one camera includes a filter to facilitate detection of damage to the damaged vehicle.

24. The system as recited in claim 14, wherein the at least one camera includes a Gabor filter.

25. The system as recited in claim 14, wherein the mobile computing device is a mobile computer configured to be mounted within an inspection vehicle.

26. The system as recited in claim 14, wherein the computing device is a mobile phone or smart device.

27. The system as recited in claim 14, further comprising a graphical user interface which allows additional data relating to the damaged vehicle to be provided to the computing device and stored in the memory of the computing device.

28. The system as recited in claim 14, further comprising a data analysis module which compares baseline condition data for the damaged vehicle to present condition data to determine an amount of damage to the vehicle.

29. The system as recited in claim 28, wherein the computing device includes the data analysis module.

30. The system as recited in claim 14, further comprising a FLIR One-shot deflectometry unit.

31. The system as recited in claim 14, further comprising an XG/CV-X series Machine Vision Systems Lineup Catalog.

32. The system as recited in claim 14, further comprising a 3D scanner.

33. The system as recited in claim 14, further comprising an optoNCDT laser triangulation sensor.

34. The system as recited in claim 14, wherein the frame is associated with a drone.

35. A remote appraisal system for a damaged vehicle, comprising:
   i) a frame configured to be attached to a wheeled inspection vehicle;
   ii) an armature movable secured to the frame;
   iii) a plurality of rails, wherein the armature is adapted for linear movement along at least one of the plurality of rails;
   iv) at least one camera operatively coupled with the frame for taking imagery of the damaged vehicle;
   v) at least one lighting apparatus operatively coupled with the frame for illuminating the damaged vehicle; and
   vi) a mobile computing device in communication with the at least one camera for receiving the imagery from the at least one camera, the mobile computing device including memory and a processing unit, wherein the processing unit is disposed in communication with said memory, and the processing unit upon execution of instructions stored in the memory is configured to cause the at least one camera to take the imagery.

36. The system as recited in claim 35, wherein the plurality of rails includes a longitudinally extending slide rail and a vertical slide rail.

37. The system as recited in claim 36, further comprising a movable platform movably coupled with the longitudinally extending slide rail, wherein the at least one camera is coupled with the movable platform.

38. The system as recited in claim 35, wherein the frame further comprising an awning for covering the damaged vehicle during a damage assessment.

39. The system as recited in claim 35, further comprising a LIDAR scanner.

* * * * *